United States Patent [19]

Yasui et al.

[11] Patent Number: 4,903,271

[45] Date of Patent: Feb. 20, 1990

[54] LASER APPARATUS

[75] Inventors: Koji Yasui; Masaaki Tanaka; Shigenori Yagi; Masaki Kuzumoto; Yasuhito Myoi; Kazuki Kuba, all of Hyogo, Japan

[73] Assignee: Mitsubishi Denki Kabushiki Kaisha, Tokyo, Japan

[21] Appl. No.: 201,999

[22] Filed: Jun. 3, 1988

[30] Foreign Application Priority Data

| Jun. 3, 1987 | [JP] | Japan | 62-139438 |
| Jul. 22, 1987 | [JP] | Japan | 62-181186 |
| Jul. 24, 1987 | [JP] | Japan | 62-183678 |
| Nov. 27, 1987 | [JP] | Japan | 62-299369 |
| Dec. 10, 1987 | [JP] | Japan | 62-312523 |
| Dec. 10, 1987 | [JP] | Japan | 62-312524 |
| Dec. 11, 1987 | [JP] | Japan | 62-313314 |
| Feb. 16, 1988 | [JP] | Japan | 63-31896 |
| Feb. 16, 1988 | [JP] | Japan | 63-31895 |

[51] Int. Cl.$^4$ .............................................. H01S 3/10
[52] U.S. Cl. .................................... 372/9; 372/95; 372/99; 372/103; 372/108
[58] Field of Search .............. 372/9, 99; 376/95, 103; 378/108, 101; 427/164

[56] References Cited

U.S. PATENT DOCUMENTS

| 4,327,129 | 4/1988 | Sepp | 427/164 |
| 4,553,244 | 11/1985 | Benedict et al. | 378/108 |

Primary Examiner—Léon Scott, Jr.
Attorney, Agent, or Firm—Sughrue, Mion, Zinn, Macpeak & Seas

[57] ABSTRACT

A laser apparatus has a phase regulator for regulating phase of output laser beam is provided, in which a full reflection portion of an output mirror is made partially reflective and a relative optical length thereof to a non-reflection portion of the output mirror is regulated by a relative thickness thereof. In one aspect of the invention, a coating provided on a center portion of an inner surface of an output mirror of a resonator comprises a partially reflective coating and a phase difference between laser beam portions passing through the center portion and a surrounding portion is regulated by a thin membrane having same refraction index as that of a matrix of the output mirror and provided between the matrix and a coating on either surface of the output mirror.

17 Claims, 16 Drawing Sheets

TEM$_{11}$ MODE (HELMITIAN GAUSSIAN)

TEM$_{21}$ MODE (HELMITIAN GAUSSIAN)

TEM$_{10}$ MODE (LAGUERRE GAUSSIAN)

LASER APPARATUS

BACKGROUND OF THE INVENTION

The present invention relates to a laser apparatus and, particularly, to a laser apparatus capable of producing a high power and high quality laser beam.

FIG. 49 is a cross section of an example of a conventional laser apparatus such as shown in Hamazaki "Practical Laser Machinings", 1986, Tech Publishing Co. In FIG. 48, a reference numeral 1 depicts a convex laser output mirror matrix having a full reflection coating 40 on a center portion of an inner surface thereof, an annular non-reflection coating 2 on an outside of the full reflection coating 40 and a non-reflection coating 2 on an outer surface thereof. 6 depicts a concave collimating mirror and 7 a laser medium such as $CO_2$ gas to be excited by, for example, electric discharge or a glass material to be excited by such as flash lamp when the laser apparatus is of solid state type. Reference numerals 8 and 9 depict laser beams produced in an unstable resonator composed of the mirrors, an output laser beam being shown by a reference numeral 10.

The laser beam 8 fully reflected and enlarged by the full reflection coating 40 on the inner surface of the output mirror is collimated by the collimating mirror 6 to parallel laser beam 9 while amplified by the laser medium 7 and an annular ring shaped laser beam 10 is derived from an outside portion of the full reflection coating 40 as an output beam having a distribution pattern such as shown in FIG. 50a and a substantially uniform phase and a portion of the laser beam fallen in the coating 40 is reflected back to the resonator in which it reciprocates while being amplified.

In order to utilize such ring shaped output laser beam for a laser machining, it is necessary to condense it by a lens system. In such case, however, it is very difficult to condense it without sidepeaks as shown in FIG. 50b due to diffraction effect of laser ring. The magnitude of the sidepeak is determined by the magnification factor M which is the ratio of an outer diameter to an inner diameter of the ring, the larger M value providing the better condensation. Therefore, the sidepeaks can be minimized by reducing an outer diameter of the full reflection coating 40. In such case, however, a considerable portion of laser energy is derived every reciprocation of beam in the resonator, resulting in a degradation of coupling rate of the resonator and a degradation of oscillation efficiency. Therefore, the upper limit of the industrially usable M value is usually about 2 at most.

Further, since the partial reflection mirror matrix 1 is heated non-uniformly by the ring shaped output beam, the matrix 1 is subjected to a non-uniform internal thermal stress, causing a phase distribution of the output beam to be disordered.

Further, when it is desired to obtain a higher output laser beam, there is a strong possibility of damage of the full reflection coating 40 since beam intensity in a center portion of the resonator becomes high.

In case of the solid state laser device, there are various phase distributions in the laser beam reciprocating in the resonator. Among others, the so-called $TEM_{oo}$ mode beam is considered as suitable for use in laser machining. However, $TEM_{oo}$ mode laser beam has a small angle of divergence and the cross section thereof is the minimum among others. Therefore, in order to select this mode, it is necessary to arrange an aperture member having a small opening in an optical path. For the case of YAG laser having radii of curvature of the full reflection mirror 6 and the output mirror 1 being 20 m, respectively, and an optical distance therebetween being 1 m, as an example, a diameter of $TEM_{oo}$ laser beam within the resonator is 1.8 mm since wavelength of the laser is 1.06 $\mu$m. That is, the laser machining must be performed with very small power obtainable from such small diameter laser beam. In order to derive a power high enough to perform a desired machining, it is necessary to increase beam intensity within the solid medium, causing the latter to be distorted. Thus, the beam quality is degraded and, in some cases, a multimode is generated. Therefore, the maximum output power of the conventional solid state laser device has been 10 W to 20 W, at most.

SUMMARY OF THE INVENTION

An object of the present invention is to provide a laser apparatus which has a laser output mirror capable of producing a coherent laser beam which is easily condensed to a filled-in cross section.

Another object of the present invention is to provide a laser apparatus capable of producing a high quality, high output laser beam having a large cross section.

A further object of the present invention is to provide a laser apparatus capable of producing a high quality laser beam without degrading the oscillation efficiency thereof.

According to the present invention, a coating provided on a center portion of an inner surface of an output mirror of a resonator comprises a partially reflective coating and a phase difference between laser beam portions passing through the center portion and a surrounding portion is regulated by a thin membrane having same refraction index as that of a matrix of the output mirror and provided between the matrix and a coating on either surface of the output mirror.

The laser output mirror allows a portion of an output laser beam to pass through so that a cross section of a resultant output laser beam becomes a filled-in pattern. The thin membrane disposed between the mirror matrix and the coating regulates phase of the resultant output laser beam to achieve a favorable condensation of output laser beam.

DETAILED DESCRIPTION OF THE PREFERRED EMBODIMENTS

Figure 1:
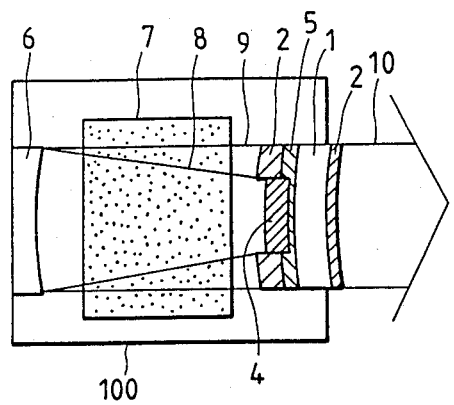
FIG. 1 is a cross section of a laser apparatus according to an embodiment of the present invention.

In FIG. 1, a reference numeral 1 depicts a convex laser output mirror matrix of such as ZnSe. The mirror matrix 1 has non-reflective coatings 2 each of which may be a single layer of PbF$_2$ on an annular portion of an inner surface and on an outer surface, respectively. A center portion of the inner surface of the mirror matrix 1 inside the annular coating 2 is covered by a partial reflective coating 4 which may be a multi-layer of, for example, ZnSe and ThF$_4$, etc. A reference numeral 5 depicts a thin membrane having the same refraction index as that of the mirror matrix 1 and of, for example, ZnSe, disposed between the mirror matrix 1 and the coatings 2 and 4 on the inner surface of the matrix 1, 6 a concave collimating mirror and 7 a laser medium of gas to be excited by electric discharge for such as CO$_2$ gas laser or a glass material to be excited by flash lamp etc. for a solid state laser. Reference numerals 8 and 9 depict laser beams produced in an unstable resonator constituted with the output mirror and the collimating mirror 6, 10 an output laser beam derived from the resonator and 100 a frame of the laser apparatus.

In operation, the laser beam 8 partially reflected and magnified by the partial reflective coating 4 on the inner surface of the output mirror is converted by the collimating mirror 6 into the parallel beam 9 while amplified by the laser medium 7. A center portion of the parallel beam 9 is outputted through the partial reflective coating 4 and the remaining annular portion thereof is outputted through the non-reflection coating 2. These two laser portions are combined to form an output laser beam 10. Since a cross section of the output laser beam 10 is filled in, a condensation thereof is facilitated. In order to make the condensation more favorably, it is necessary that the coherency of the output beam is high. In order to realize this, it is enough to remove phase difference between the beam portions passing through the respective coatings 2 and 4 since the laser beam 9 produced in the unstable resonator is highly coherent. However, since the coatings 2 and 4 are different in reflectivity and construction from each other, it is usual that there is a phase difference between laser beams passing through the respective coatings. According to the present invention, such phase difference is removed by the thin membrane 5 provided between the mirror matrix 1 and the coatings 2 and 4. The thin coating 5 has the same refraction index as that of the mirror matrix 1 and a distributed thickness. Assuming that the laser beam passed through the partial reflective coating 4 is in advance in phase by $\delta$ from that passed through the non-reflective coating 2, the thickness of the thin membrane 5 below the coating 2 is made thicker than that below the coating 4 by $$d = (n-1)\lambda \cdot \delta / 360$$

where $\lambda$ is wavelength of the beam and n is refraction index of the thin membrane 5.

Figure 2A:
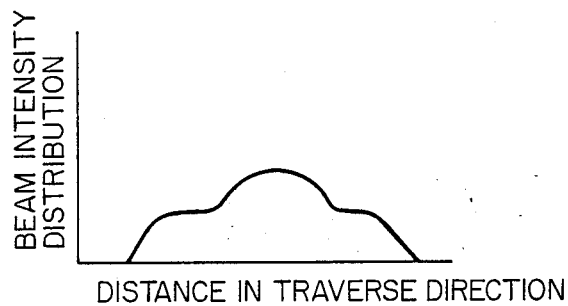
FIGS. 2a and 2b show characteristics curves of laser beams obtained by the present invention, respectively.
Figure 2B:
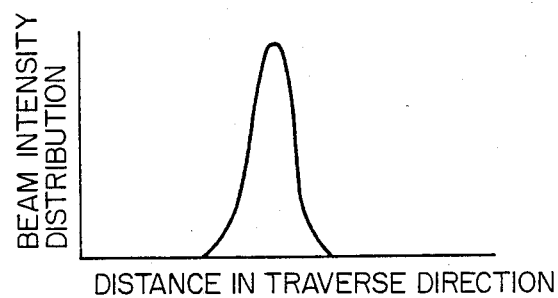

FIG. 2a shows a distribution of an output laser beam obtained by a CO$_2$ gas laser having the present laser output mirror and having a favorable coherency and FIG. 2b shows a beam pattern obtained by condensing the output laser beam, diagrammatically. As shown in FIGS. 2a and 2b, the resultant output laser beam has no substantial side peaks and is well condensed.

Figure 3:
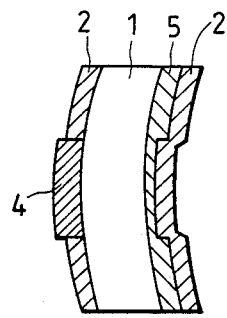
FIGS. 3 to 5 show cross sections of laser output mirrors according to other embodiments of the present invention, respectively.

FIG. 3 shows another embodiment of the output mirror according to the present invention. In FIG. 3, a thin membrane 5 which is similar to the thin membrane 5 in the preceding embodiment is disposed in a mirror matrix 1 and a coating 2 on an outer surface of the matrix 1.

Figure 4:
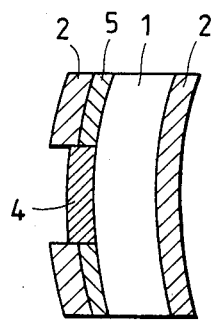
Figure 5:
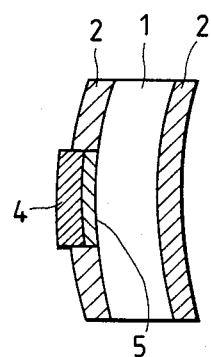

FIG. 4 shows another embodiment in which a thin membrane 5 is disposed between an annular coating 2 on an inner surface of a mirror matrix 1 and the latter. Further, in another embodiment shown in FIG. 5, a thin membrane 5 is disposed between a mirror matrix 1 and a coating 4 on a center portion of an inner surface of the mirror matrix 1.

Figure 6:
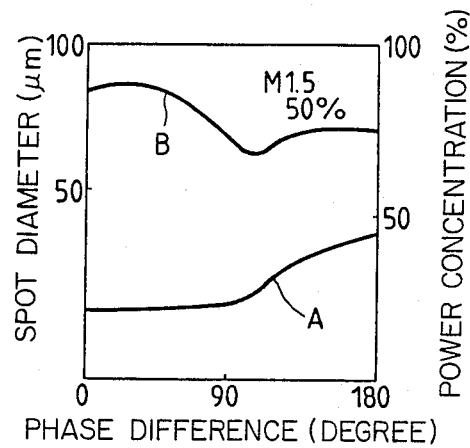
FIG. 6 shows relations of phase difference to spot diameter and to power concentration of output laser beam obtained by the present invention.
Figure 7:
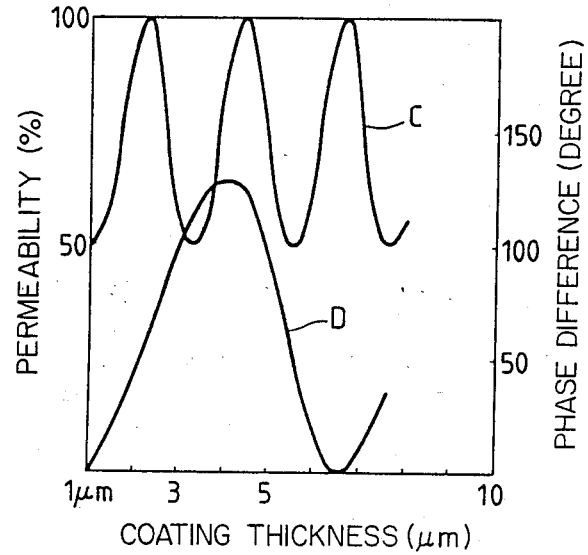
FIG. 7 shows relations of thickness of coating to permeability and to phase difference of output laser beam obtained by the present invention.

FIG. 6 shows curves A and B showing a relation between diameter of a condensed light spot at a point at which light intensity becomes $1/e^2$ and phase difference and a relation between a ratio (power concentration) of laser power to a whole laser power and phase difference, respectively, and FIG. 7 shows relations C and D of beam permeability and phase difference with respect to the thickness of the coating 2 on the inner surface of the matrix 1 in the embodiment shown in FIG. 4, when the reflectivity of the partial reflective coating 4 is 50% and a ratio of a diameter of the output beam to that of the coating 4 is 1.5. As is clear from FIG. 6, the spot diameter is small and thus the power concentration is high when the phase difference is restricted less than 45° while, when the difference is larger than 100°, the spot diameter is enlarged and thus the power concentration is degraded. Further, as shown in FIG. 7, the curves in which are obtained when the coating 5 of PbF$_2$ (refraction index: 1.55) is formed on the mirror matrix 1 of ZnSe to a thickness of 1.7 $\mu$m and the partial reflective coating 4 of PbF$_2$ is formed on the center portion to a thickness of 2.7 $\mu$m, the thickness of the inner coating 2 of ZnSe which is necessary to obtain the desired spot diameter and hence the power concentration mentioned above which are obtainable when the permeability is about 100% and the phase difference is less than 45° is about 6.5 $\mu$m.

A surface roughness of the inner coating 2 so thick as above may be somewhat large when it is manufactured industrially. However, since the laser beam passing through the inner coating 2 does not attribute to resonance, an effect of the surface roughness of the inner coating 2 on laser oscillation may be neglected.

Figure 8:
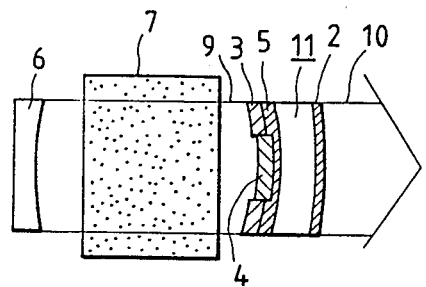
FIG. 8 is a cross section of another embodiment of a laser apparatus according to the present invention.

FIG. 8 shows another embodiment in which the present invention is applied to a stable type resonator having a concave laser output mirror matrix 11. In this embodiment, it is possible to produce a Gaussian mode beam efficiently when a reflectivity of an annular coating 3 on an inner surface of the mirror 11 is smaller than that of a partial reflective coating 4 on a center portion of the surface.

Figure 9:
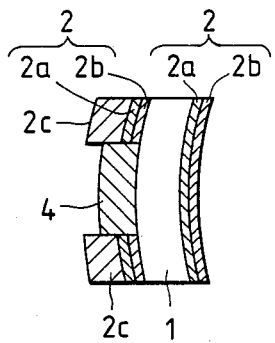
FIGS. 9 and 10 are cross sections of other embodiments of the output mirror according to the present invention.

FIG. 9 shows a further embodiment of the present invention, in which a non-reflective coating 2 on an outer surface of a mirror matrix 1 is a lamination of coatings 2a and 2b and a non-reflection annular coating 2 on an inner surface of the mirror matrix 1 is a lamination of coatings 2a, 2b and 2c.

Figure 10:
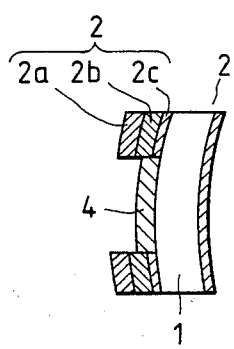

In FIG. 10 which shows another embodiment of the present invention, a non-reflection coating 2 on an outer surface of a mirror matrix 1 is a single layered coating 2, while a non-reflection annular coating 2 on an inner surface of the matrix 1 is a lamination of coatings 2a, 2b and 2c, as in the case shown in FIG. 9.

Figure 11:
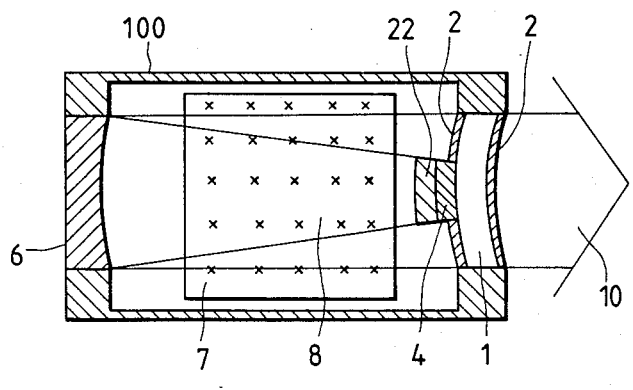
FIG. 11 is a cross section of another embodiment of the present invention.

FIG. 11 shows another embodiment in which an output mirror is constituted with a concave matrix 11 as in the case of the embodiment in FIG. 8 except that a coating 22 for regulating a relative thickness of a partial reflection coating 4 to a non-reflection coating 2 on an inner surface of the mirror 11 is provided on the partial reflection coating 4.

Figure 12:
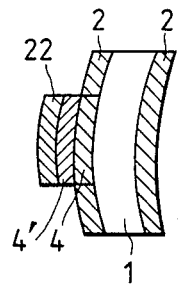
FIGS. 12 and 13 are cross sections of other embodiments of the output mirror according to the present invention, respectively.
Figure 13:
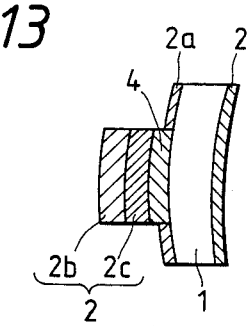
Figure 14:
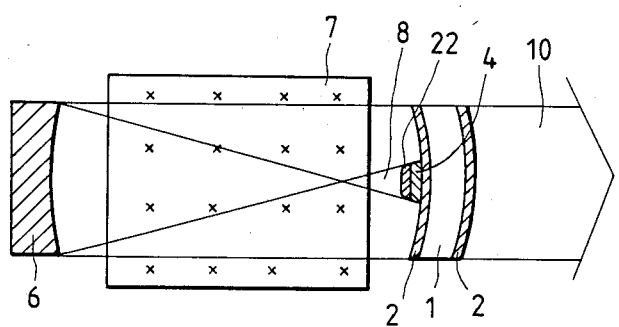
FIGS. 14 to 25 are cross sections of other embodiments of the present invention, respectively.

FIGS. 12 to 14 show other embodiments of the present invention, respectively. In FIG. 12, on a central partial reflective coating 4, a thickness regulating coating 22 is formed and, in FIG. 12, a double layered thickness regulating coating 22 is provided on a partial reflective coating 4. In the embodiment in FIG. 13, a multi-layered thickness regulating coating 22 is provided on a partial reflective coating 4. In FIG. 14, a thickness regulating coating 22 is provided on a partial reflective coating 4 which is formed on a non-reflective coating 2 on an inner surface of a convex mirror matrix 11.

These multilayered thickness regulating coating make the relative thickness regulation of the partial reflection coating 4 to the non-reflection coating 2 surrounding it easier.

Figure 15:
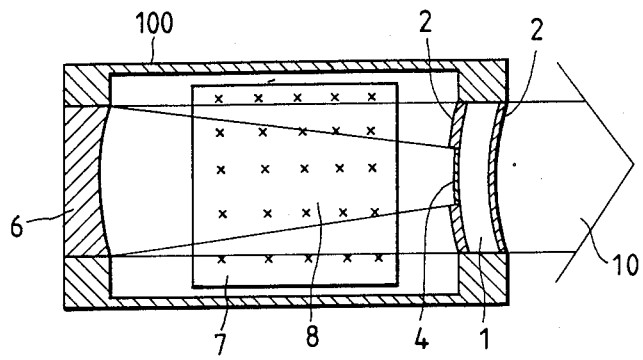

FIG. 15 shows another embodiment of the present invention, in which a thickness of a partial reflective coating 4 provided on a center portion of a convex output mirror matrix 1 is made thicker than that of a non-reflective coating 2 provided around the partial reflective coating 4.

Figure 16:
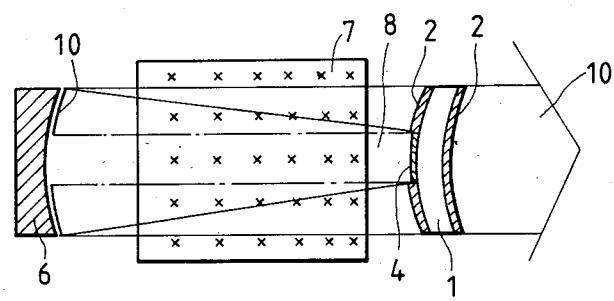

FIGS. 16 to 24 show other embodiments of the present invention, respectively, which are suitable to compensate phase difference of more than 100° between beam portions passing through a non-reflective coating and a partial reflection coating of an output mirror. In FIG. 16, a center portion of an inner surface of a convex mirror matrix 1 is covered by a partial reflective coating 4 and the remaining portion of the inner surface is covered by a thinner non-reflection coating 2. An outer surface of the matrix 1 is covered by a non-reflection coating 2.

Figure 17:
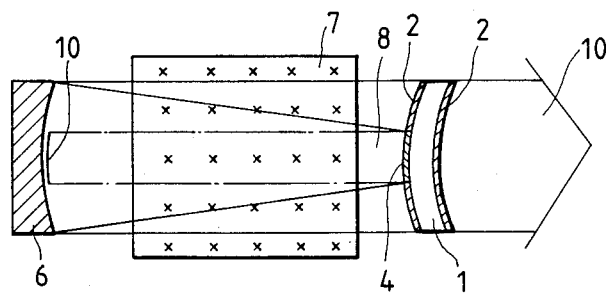

In FIG. 17, a reflection membrane 10 in the form of a metal thin film having the same pattern as that of a partial reflective coating 4 on an inner surface of a mirror matrix 1, whose thickness is determined such that a phase difference between lights passing through the partial reflective coating 4 and a non-reflective coating 5 larger than 100° is cancelled out thereby, is provided on a concave inner surface of a collimating mirror 6.

That is, when light passed through the partial reflective coating 4 advances light passing through the non-reflective reflective coating 5 by δ°, the thickness of the metal membrane 10 is determined by $d = \lambda \cdot \delta / 360$.

Figure 18:
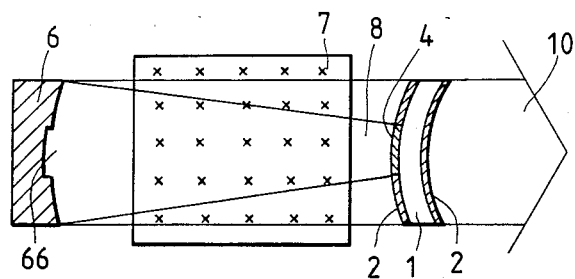
Figure 19:
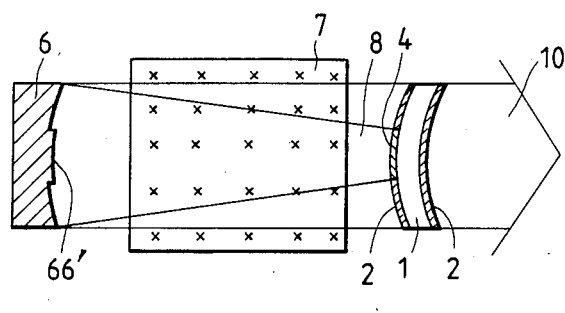

In FIG. 18, a recess 66 is formed in an inner surface of a collimating mirror 6, which has the same pattern as that of a partial reflective coating 4 provided on an inner surface of a convex mirror matrix 1. FIG. 19 shows another embodiment which differs from the embodiment shown in FIG. 18 in only that a protrusion 66' is formed on the inner surface of the collimating mirror 6, instead of the recess 66. The depth of the recess 66 and the height of the protrusion 66' are determined by the above equation.

Figure 20:
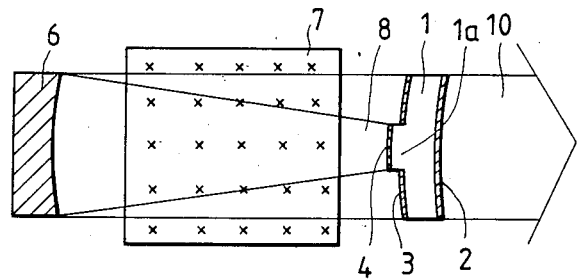
Figure 21:
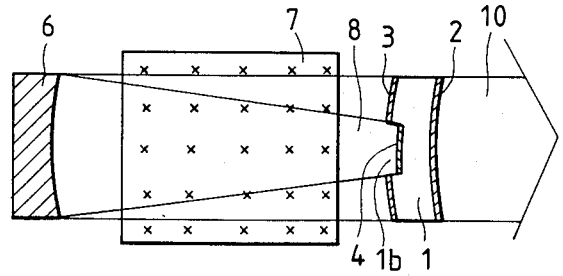

In an embodiment shown in FIG. 20, an inner surface of a mirror matrix 1 is protruded inwardly to form a land 1a on which a partial reflective coating 4 is formed and, in FIG. 21, a recess 1b is formed, similarly. The height and the depth thereof are determined as mentioned above.

Figure 22:
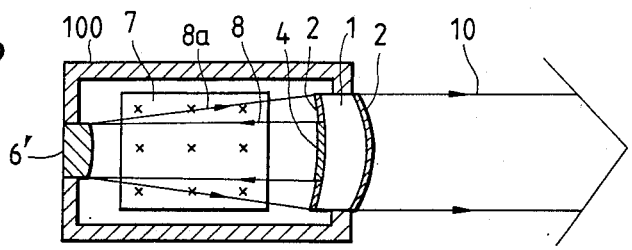
Figure 23:
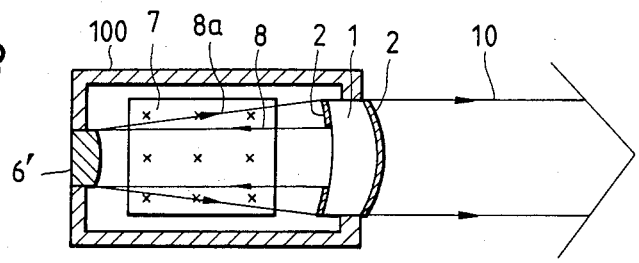
Figure 24:
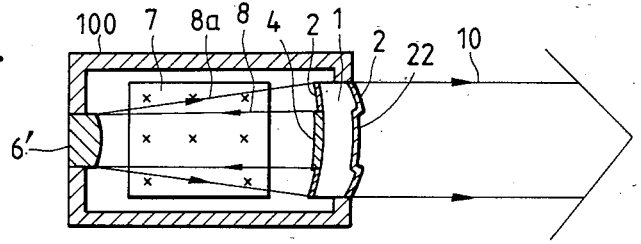

FIGS. 22 to 24 show other embodiments of the present invention, in which a collimating mirror 6 is replaced by an enlarging mirror 6' and an output mirror 1 takes in the form of a concave mirror. In these figures, the output mirror 1 has an outer surface having a radius of curvature smaller than that of an inner surface thereof. In FIG. 22, a partial reflective coating 4 is made thicker than a non-reflecting coating 2 and, in FIG. 23, a partial reflective surface is provided by removing a center portion of a non-reflective coating 2. In FIG. 24, a recess 22 is formed on the outer surface of the concave mirror 1 to provide a difference in optical path length between beams passing through the non-reflection coating 2 and a partial reflective coating 4 to thereby cancel a phase difference.

It should be noted that the convex mirror 6' in each of the embodiments shown in FIGS. 22 to 24 can be substituted by a concave mirror, with the same effect. For example, in FIG. 25, the full reflection mirror is a collimating mirror and other constructions are the same as those shown in FIG. 22.

Figure 25:
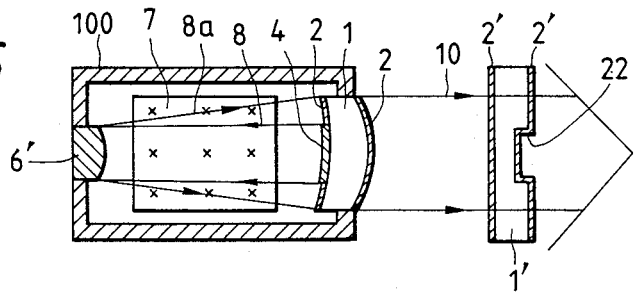

FIG. 25 shows another embodiment which is similar to the embodiment in FIG. 22 and further comprises a phase compensating mirror 1' in the form of flat mirror having opposite surfaces coated with non-reflective coating 2, an outer surface being recessed to provide the same effect obtained by the output mirror shown in FIG. 24.

Figure 26:
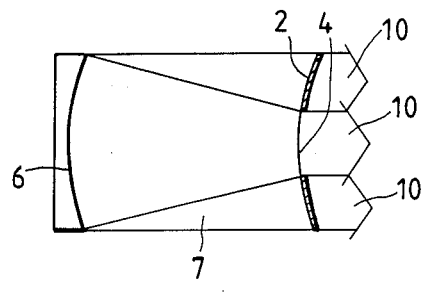
FIGS. 26 to 38 are cross sections of other embodiments of the present invention, respectively.

The principle of the present invention can also be applied to a semiconductor laser such as YAG laser. FIG. 26 shows an embodiment of the present invention applied to a solid state laser apparatus. In FIG. 26, a full reflection mirror 6 is formed by etching one end of a semiconductor laser element 7 having a laminate structure of a substrate of such as n type GaAs, a clad layer of such as n type $Ga_{0.9}Al_{0.1}$. As disposed on the substrate, an active medium layer of such as p type GaAs, another clad layer disposed on the active layer, a cap layer of such as p type GaAsa disposed on the last clad layer and electrodes sandwiching the lamination and vapor-depositing a metal material thereon.

Figure 27:
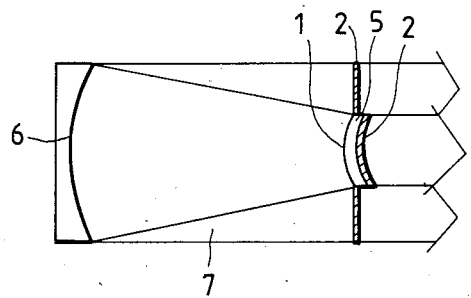
Figure 28:
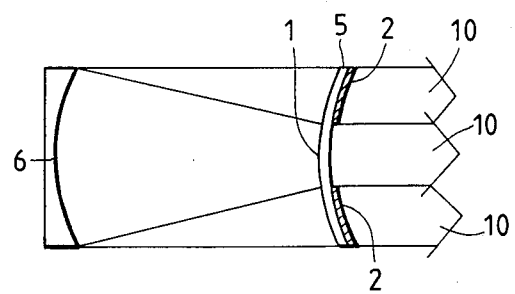

The other end surface of the semiconductor laser element 7 is etched and metal vapor-deposited to form a concave enlarging mirror on an outer peripheral portion of which is coated with non-reflection material to form an annular non-reflective coating 2 leaving a central portion as a partial reflection mirror portion 4. In another embodiment shown in FIG. 27, a center portion of the other end surface of the solid element 7 is etched and vapor-deposited with a partial reflection material to form an enlarging partial reflective mirror 1 and all of the other end surface is coated with non-reflection coating 2. In FIG. 28, the other end surface is etched and vapor-deposited and an outer periphery thereof is further coated with non-reflective material 2. Of course, it is possible to provide at least either of the full reflection mirror and output mirror separately from the solid element. In such case, the end surface of the element facing a separately provided mirror is made flat and provided with non-reflection coating.

Figure 29:
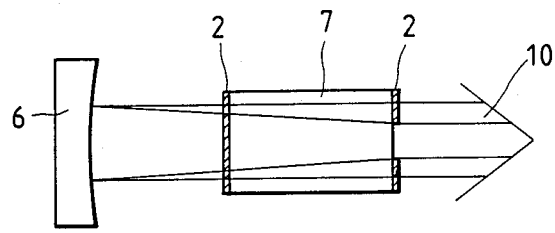
Figure 30:
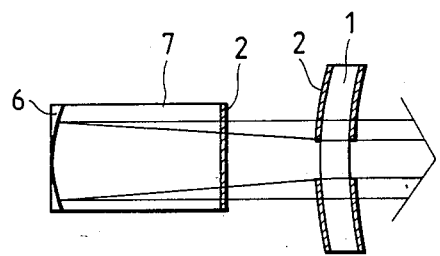
Figure 31:
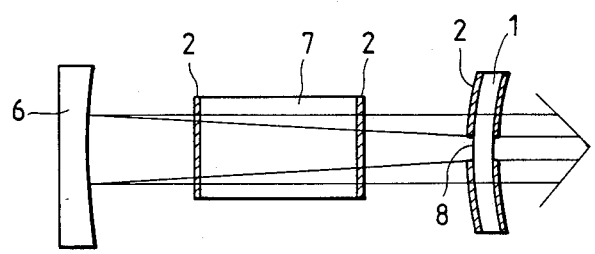

FIGS. 29 to 31 show other embodiments in which at least either of the full reflection mirror and the output mirror is provided separately. In FIG. 29, a full reflection mirror 6 is prepared separately and, in FIG. 30, an output mirror is provided separately. In FIG. 30, the output mirror 1 is composed of a convex mirror matrix having opposite surfaces coated with non-reflection material peripherally. In the embodiment shown in FIG. 31, a full reflection mirror and an output mirror are provided separately.

Figure 32:
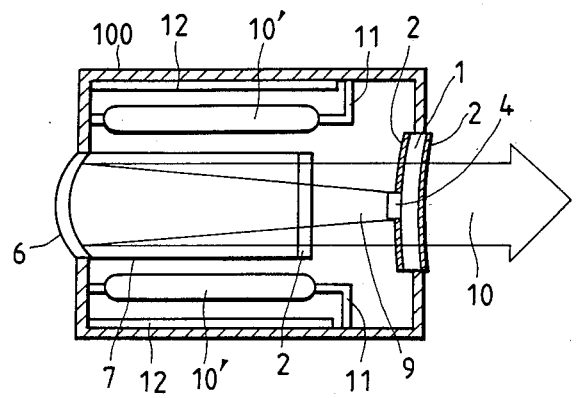
Figure 33:
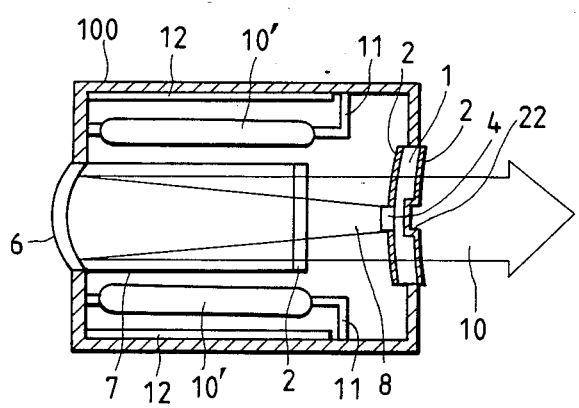
Figure 34:
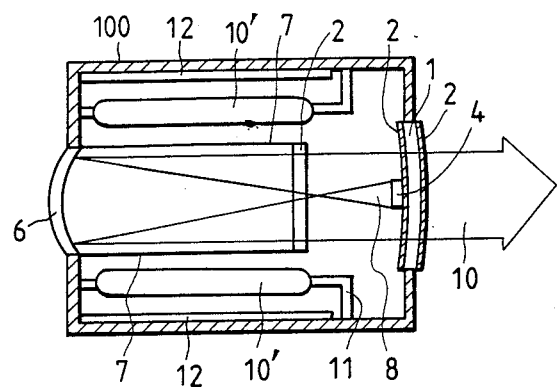
Figure 35:
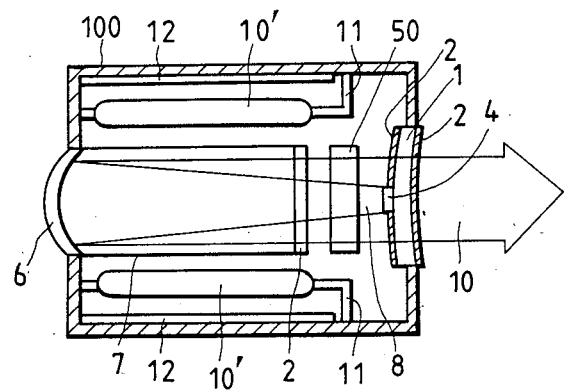

FIGS. 32 to 38 show other embodiments of the present invention when applied to the solid state laser device. In FIG. 32, a full reflective mirror 6 is formed on one end of a solid state laser element 7 by vapor-depositing a metal and a convex output mirror 1 is arranged on the other side of the solid state laser element 7 the other end surface of which is coated by a nonreflective membrane 2. The output mirror 1 has an outer surface coated with a non-reflective coating 2 of such as $SiO_2$ and an inner surface coated peripherally with a non-reflective coating of the same material and centrally with a partial reflective coating 4 of such as $TiO_2$ and constitutes, together with the full reflection mirror 6, an unstable resonator. The solid state laser element 7 is excited by, for example, flash lamps 10' arranged within a frame 100. Reference numerals 11 and 12 show a support for the lamps and a reflector, respectively. FIG. 33 shows another embodiment which is similar to that shown in FIG. 32 except that a center portion corresponding to the partial reflective coating on the inner surface of the outer surface of the output mirror is recessed. In an embodiment shown in FIG. 34, the output mirror is replaced by a concave mirror. In FIG. 35, a Q switch element 50 such as Pockels element is added in between the other end of the solid state element 7 and the output mirror of the embodiment shown in FIG. 32, to realize a Q switch pulse oscillation to thereby obtain an output laser beam having a higher peak output power. When a wavelength conversion element such as KTP element is used for the element 50, it is possible to perform an effective wavelength conversion. A combination of the Q switch element and the wavelength conversion element may be used as the element 50.

Figure 36:
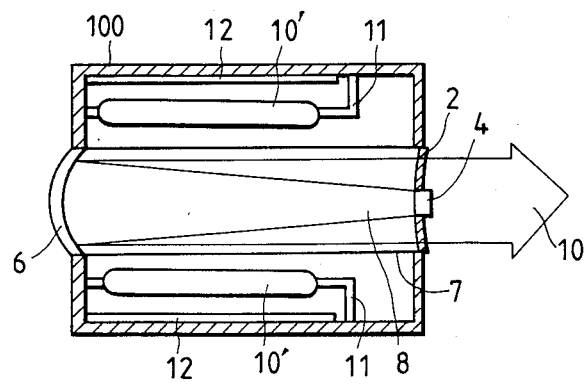
Figure 37:
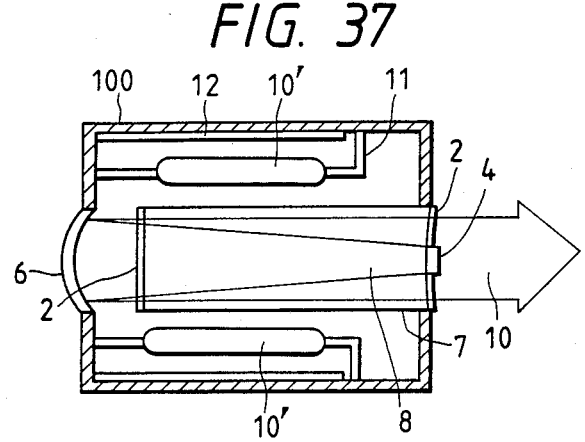
Figure 38:
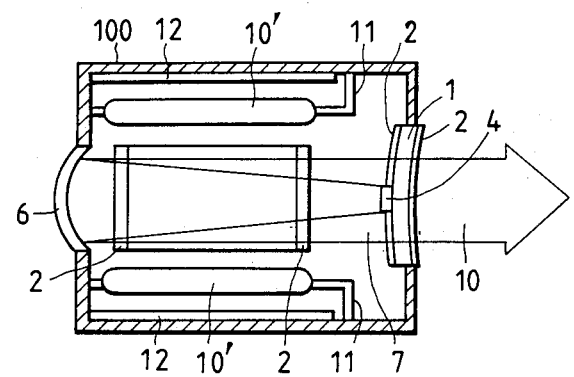

FIG. 36 shows another embodiment in which the other end surface of the solid state laser element 1 is coated directly with a non-reflective coating 2 to form an output mirror and, in FIG. 37, the one end of the solid state laser element is coated with a non-reflective coating 2 and opposes to the collimating mirror provided separately. FIG. 38 shows another embodiment which is similar to that shown in FIG. 32 except that the one end of the laser element is coated with a non-reflective coating 2 and opposes to a separately provided collimating mirror 6.

Figure 39:
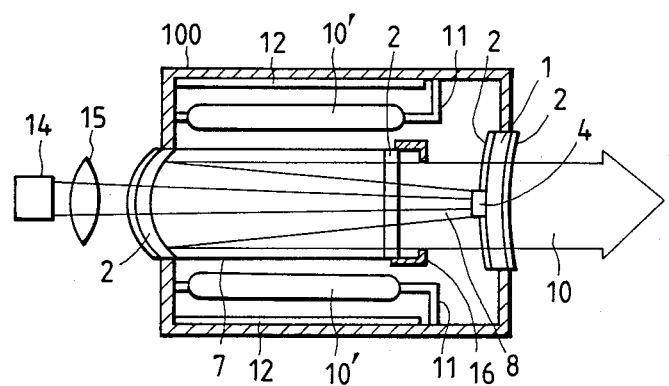
FIG. 39 is a cross section of another embodiment of the present invention.

FIG. 39 shows another embodiment which is similar to that shown in FIG. 32 except that an auxiliary exciting light source 14 such as a semiconductor laser device is provided. A laser beam from the auxiliary light source 14 is supplied through a lens 15 to a collimating mirror formed on outer surface of the solid state element 7 coated with non-reflective coating 2 to excite a portion of the solid state element 7 along an optical axis thereof, additionally, to thereby prevent an intense, off-axis multimode output from being produced. Such auxiliary light source can be applied to any of the embodiments shown in FIGS. 33 to 38.

Figure 40:
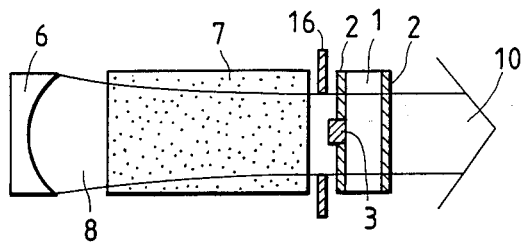
FIGS. 40 to 42 are cross sections of other embodiments of the present invention, respectively.
Figure 41:
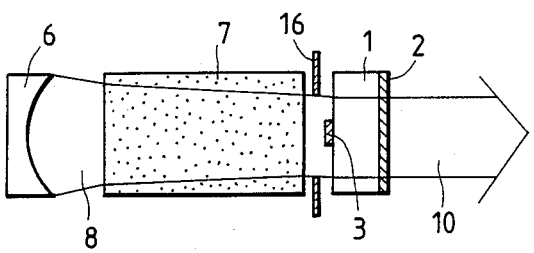
Figure 42:
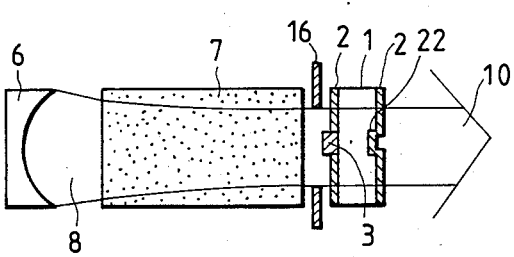

FIGS. 40 to 42 show other embodiments of the present invention when applied to a stable optical resonator of a gas laser. In FIG. 40, a flat output, partial reflection mirror 1 and a concave full reflection mirror 6 are used. An inner surface of the output mirror 1 is provided with an outer peripheral coating of low reflective, dielectric material, which may take in the form of a double layer of $ThF_4$ and/or $ZnSe$, and a central, multilayered high reflection coating 3 which may be a lamination of four membranes of such as $ThF_4$ and/or $ZnSe$. A reference numeral 16 depicts an aperture member defining an aperture of the device and 2 a non-reflection coating. The embodiment shown in FIG. 41 differs from that shown in FIG. 40 in only that the low reflection coating 2 is removed and the embodiment in FIG. 42 differs from that in FIG. 40 in that the outer surface of the output mirror 1 is recessed as in the embodiment shown in FIG. 25.

Figure 43:
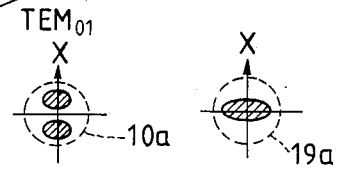
FIG. 43 is a schematic cross section of another embodiment of the present invention.
Figure 43:
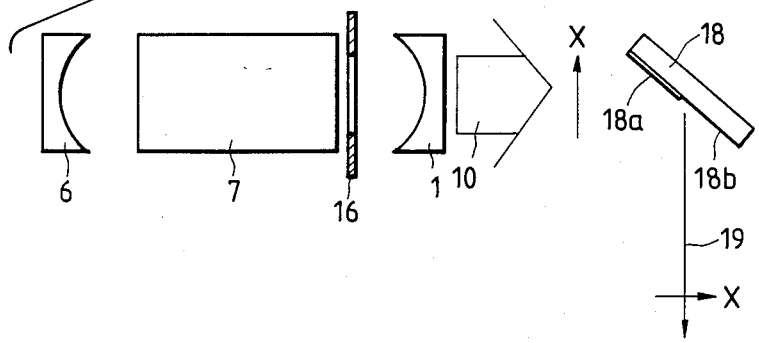
Figure 44A:
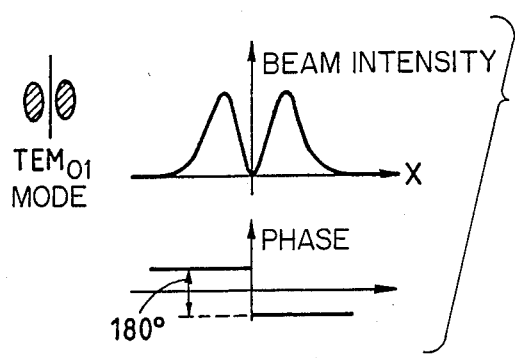
FIGS. 44a and 44b illustrate uniformity of phase of output laser beam obtained by the present invention.
Figure 44B:
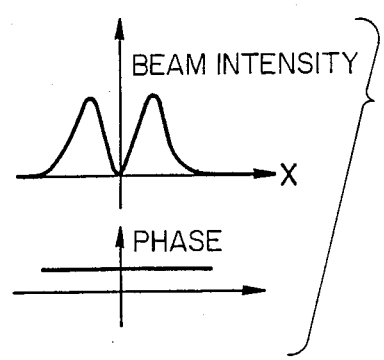
Figure 45:
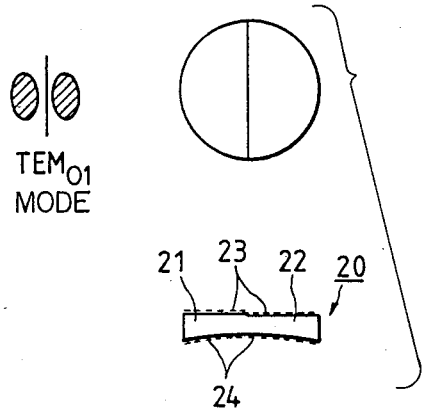
FIGS. 45 to 48 illustrate other embodiments of phase regulator according to the present invention, respectively.

FIG. 43 shows another embodiment of the present invention, in which the phase regulation of an output laser beam is performed by a phase regulator 18 disposed upstream of an output mirror 1 of a resonator. In FIG. 43, the phase regulator 18 takes in the form of a flat mirror disposed obliquely to an optical axis of the resonator. The regulator 18 has a reflection surface composed of an upper reflection area 18a and a lower reflection area 18b, a boarder line being stepped to provide a phase difference between beam portions reflected by these reflection areas by $\lambda/2$ where $\lambda$ is wavelength of the beam. An output laser beam 10 from the output mirror 1 has a $TEM_{ol}$ mode as shown by 10a when a diameter of an aperture member 16 disposed in front of the output mirror 1 is made larger than a value by which a $TEM_{oo}$ mode is obtained. In a case of a $CO_2$ gas laser with a radius of curvature of the full reflection mirror of 20 m, radius of curvature of the partial reflection mirror 2 of 10 m and a distance between the mirrors of 1.8 m, $TEM_{01}$ mode is obtained when the aperture size is 14.5 mm and $TEM_{oo}$ mode is obtained when the aperture size is 12 mm. In the case of $TEM_{01}$ mode, an intensity distribution of the beam 7 and the phase difference in X direction become as shown in FIG. 44a. That is, although two peaks has the same intensity, the phase is different from each other by 180°. However, as shown in FIG. 44b, the phase difference is removed by reflecting the regulator 8 while the intensity distribution is unchanged. As a result, the phase of the output laser beam is substantially uniformized. By condensing such beam as beam 9 in FIG. 43 having uniform phase by means of a lens system, a beam having a peak intensity at its center is obtained. FIG. 45 is a cross section of another embodiment of the phase regulator which is formed integrally with the partial refection mirror 4 and depicted by 20. In FIG. 45, a lower surface 24 of the regulator 20 forms the partial reflection mirror 4 and an upper stepped surface functions as the regulator 8. That is, a portion 21 of the upper surface 23 corresponds to the upper portion 8a of the regulator 8 in FIG. 43 and a next portion 22 thereof serves as the lower portion 8b of the regulator 8. A difference in thickness between the portions 21 and 22 is selected such that a difference in optical length n.l therebetween becomes $\lambda/2$, where n is refraction index of the mirror matrix and $l$ is thickness thereof.

Figure 46:
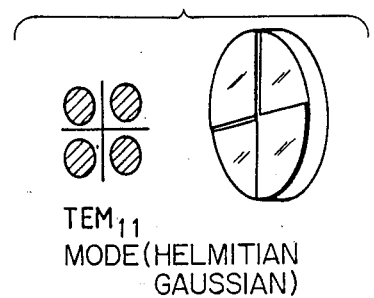
Figure 47:
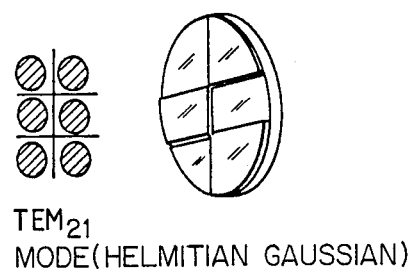
Figure 48:
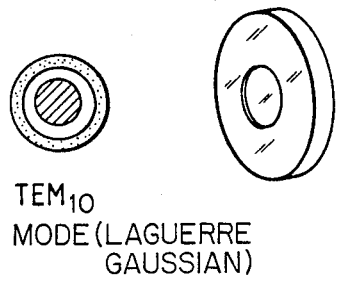
Figure 49:
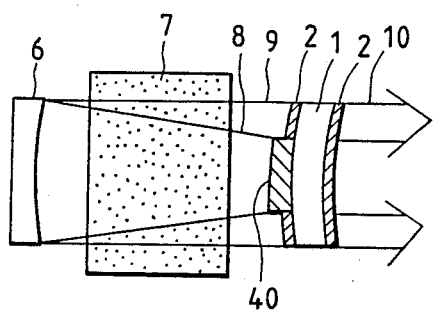
FIG. 49 is a cross section of a conventional laser apparatus.
Figure 50A:
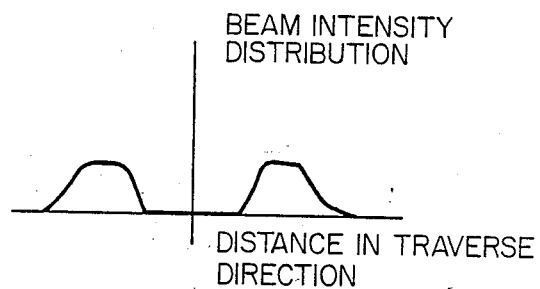
FIGS. 50a and 50b show output beam distributions obtained by the conventional apparatus shown in FIG. 49.
Figure 50B:
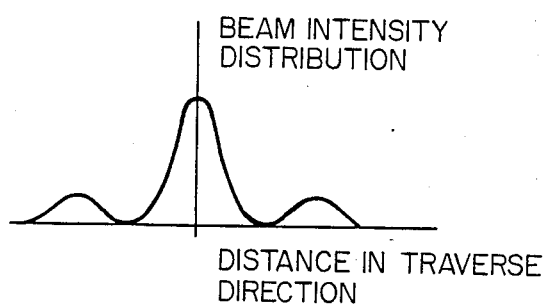

FIGS. 46 to 48 illustrate the phase regulators suitable for higher order modes. The regulator 10 shown in FIG. 46 is a Helmitian Gaussian type which is suitable for $TEM_{11}$ mode and the regulator 11 shown in FIG. 47 is a Helmitian Gaussian type which is suitable for $TEM_{21}$ mode. The regulator 12 shown in FIG. 48 is for a Laguerre Gaussian mode such as $TEM_{10}$ mode. The difference in optical length to be provided by the present phase regulator is not limited to $\lambda/2$, but $3\lambda/2$, $5\lambda/2$ may be possible since they are optically equivalent. Further, the these values are not always necessary to be exact and some tolerances may be allowed.

As described hereinbefore, according to the present invention, the phase difference caused in an output laser beam of the gas or solid state laser apparatus by the use of the partial reflection mirror is substantially removed by the phase regulator. Therefore, it is possible to produce a laser beam which can be well condensed by an optical lens system and can be used in various applications thereof effectively.

What is claimed is:

1. A laser apparatus, comprising: a laser medium; a resonator including a fully reflective mirror and a partially reflective mirror, said laser medium being arranged between said fully reflective mirror and said partially reflective mirror; an exciting means for exciting said laser medium; and a phase regulator for regulating the phase of an output laser beam derived through said partially reflective mirror, wherein said phase regulator comprises a partially reflective portion formed on a center portion of a matrix of said partially reflective mirror and a lower reflective portion formed around said partially reflective portion and having a lower reflectivity than that of said partially reflective portion, a thickness of said lower reflective portion being different from a thickness of said partially reflective portion is as to control phase difference between laser beams passing through said partially reflective portion and said lower reflective portion.

2. The laser apparatus as claimed in claim 1, further comprising a thin membrane formed on said matrix, the thickness of said thin membrane being regulated so as to control the relative thicknesses between said partially reflective portion and said lower reflective portion of said matrix.

3. The laser apparatus as claimed in claim 2, wherein said thin membrane is formed between said matrix and said partial reflective and said lower reflective portions.

4. The laser apparatus as claimed in claim 1, wherein said difference in thickness between said partially reflective portion and said lower reflective portion is provided by forming a recess on at least one surface of said matrix.

5. The laser apparatus as claimed in any of 1 or 3-4 inclusive wherein said laser medium is a gas medium.

6. The laser apparatus as claimed in claim 5, wherein said fully reflective mirror is a concaved colllimating mirror.

7. The laser apparatus as claimed in any of 1 or 3-5 inclusive wherein said laser medium is a solid state laser element.

8. The laser apparatus as claimed in claim 7 wherein said fully reflective mirror is formed by etching one end surface of said solid state laser element and vapor-depositing a metal thin membrane.

9. The laser apparatus as claimed in claim 7, wherein said output mirror is formed by etching the other end surface of said solid state laser element, vapor-depositing one of a partially reflective coating and lower reflective coating thereon.

10. The laser apparatus as claimed in claim 7, wherein said fully reflective mirror is a concaved collimating mirror.

11. The laser apparatus as claimed in any of 1,3-5,8 or 9 inclusive, wherein said resonator is of an unstable resonator.

12. The laser apparatus as claimed in any of 1,3-5,8 inclusive wherein said resonator is a stable resonator.

13. The laser apparatus as claimed in claim 1, wherein said phase regulator comprises a flat fully reflective mirror disposed in an optical path of said laser outputted from said resonator said fully reflective mirror including a plurality of reflective portions having reflective surfaces different in thickness from each other.

14. The laser apparatus as claimed in any of 1,3-5, or 12, inclusive further comprising an auxiliary light source for additionally exciting a portion of said solid state laser element along an optical axis thereof.

15. The laser apparatus as claimed in any of 1,3-5, or 12 inclusive wherein said fully reflective mirror is a concaved collimating mirror.

16. The laser apparatus as claimed in claim 14, wherein said fully reflective mirror is a concaved collimating mirror.

17. The laser apparatus as claimed in claim 1,3-5, or 12 inclusive wherein said fully reflective mirror is a convexed enlarging mirror.

* * * * *